US 6,550,909 B2

(12) United States Patent
Ichinose et al.

(10) Patent No.: US 6,550,909 B2
(45) Date of Patent: *Apr. 22, 2003

(54) INK-JET RECORDING METHOD AND PRINT

(75) Inventors: Hirofumi Ichinose, Tokyo (JP); Naoki Kushida, Hachioji (JP); Tsuyoshi Santoh, Yokohama (JP); Hiroyuki Ogino, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,686

(22) Filed: Oct. 9, 1998

(65) Prior Publication Data

US 2002/0048655 A1 Apr. 25, 2002

(30) Foreign Application Priority Data

Oct. 13, 1997 (JP) ............................................. 9-278730

(51) Int. Cl.[7] ................................................ B32B 3/00
(52) U.S. Cl. ......................... 347/105; 347/106; 428/195
(58) Field of Search ................................ 347/105, 106; 428/195, 212

(56) References Cited

U.S. PATENT DOCUMENTS

| 5,374,475 | A |   | 12/1994 | Walchli |
| 5,861,447 | A | * | 1/1999 | Nagasawa ..................... 523/161 |
| 6,027,210 | A | * | 9/2000 | Kurabayashi et al. ........ 347/100 |
| 6,114,020 | A | * | 9/2000 | Misuda et al. ............... 428/212 |

FOREIGN PATENT DOCUMENTS

| EP | 0 743 193 | 11/1996 |
| EP | 0 858 905 | 8/1998 |
| JP | 58-136482 | 8/1983 |
| JP | 2-276670 | 11/1990 |
| JP | 4-101880 | 3/1992 |
| JP | 6-143797 | 5/1994 |
| JP | 7-237348 | 9/1995 |
| JP | 08-002090 | * 1/1996 ............ B41M/5/00 |

(List continued on next page.)

OTHER PUBLICATIONS

Washburn, "Note on a Method of Determining the Distribution of Pore Sizes in a Porous Material", Proceesings of the National Academy of Sciences, Vol. 7, 1921, pp. 115 and 116.

Barrett et al., "The Determination of Pore Volume and Area Distributions in Porous Substances", The Journal of the American Chemical Society, Vol. LXXIII, Jan. 1951, pp. 373–380.

Primary Examiner—Bruce H. Hess
Assistant Examiner—Michael E. Grendzynski
(74) Attorney, Agent, or Firm—Fitzpatrick, Cella, Harper & Scinto (57) ABSTRACT

Disclosed herein is an ink-jet recording method in which recording is conducted with an ink comprising a pigment component on a recording medium comprising a substrate and a porous layer including polymer particles provided thereon. The method comprises, in the case where the pore diameter distribution of the porous layer including polymer particles and the particle diameter distribution of the pigment component are both expressed in terms of frequency distribution, the steps of forming an image upon controlling a proportion of the frequency of the pore diameter of the porous layer including polymer particles, which overlaps the particle diameter distribution of the pigment component, to the frequency of the whole pore diameter of the porous layer including polymer particles to from 0.1% to 10%; and heat-treating the porous layer including polymer particles after the formation of the image.

10 Claims, 4 Drawing Sheets

FOREIGN PATENT DOCUMENTS

| | | |
|---|---|---|
| JP | 8-002090 | 1/1996 |
| JP | 8-197833 | 8/1996 |
| JP | 8-230308 | 9/1996 |
| JP | 8-300802 | 11/1996 |
| JP | 9-30116 | 2/1997 |
| JP | 9-66660 | 3/1997 |
| JP | 9-123593 | 5/1997 |

* cited by examiner

INK-JET RECORDING METHOD AND PRINT

BACKGROUND OF THE INVENTION

1. Field of the Invention

The present invention relates to an ink-jet recording method which is suitable for the formation of images using inks containing a pigment component, and a print obtained by the ink-jet recording method.

2. Related Background Art

An ink-jet recording system is a recording system in which minute droplets of an ink are ejected by any of various working principles to apply them to a recording medium such as paper, thereby making a record of images, characters and/or the like, and has quickly spread as a recording system for recording apparatus of various images in various applications including information instruments because it has features such as recording can be conducted at high speed and with low noise, color images can be formed with ease, recording patterns are very flexible, and development and fixing processes are unnecessary. Further, it is beginning to be applied to a field of recording of full-color images because images formed by a multi-color ink-jet recording system are comparable in quality with multi-color prints by a plate making system and photoprints by a color photographic system, and such records can be obtained at lower cost than the usual multi-color prints and photoprints when the number of copies is small. With the improvement in recordability such as speeding up and high definition of recording and full-coloring of images, recording apparatuses and recording methods have been improved, and recording media have also been required to have higher properties. In order to satisfy such requirements, recording media have been variously improved so as to meet objects, applications and inks.

In the ink-jet recording system, droplets of an ink are ejected at high speed from a nozzle toward a recording medium. Since the ink contains a great amount of a solvent such as water or a mixed solvent of water and an organic solvent, a large amount of the ink is required to achieve a high color density. Since the ink droplets are continuously ejected, a beading phenomenon that the ink droplets fuse with each other, and dots of the ink aggregate, may occur after a first droplet is ejected, resulting in disorder of an image. Therefore, ink-jet recording media are required to combine great ink-absorbing capacity with high ink-absorbing speed.

Therefore, a great number of recording media, in which a porous layer comprising inorganic particles is formed, have been proposed. For example, in Japanese Patent Application Laid-Open No. 2-276670, a porous layer comprising an alumina hydrate is provided on a substrate for the purpose of enhancing absorbency, color reproducibility and resolution. Japanese Patent Application Laid-Open No. 4-101880 proposes a recording medium in which an ink-fixing layer is formed with a resin, which is transparent and dissolved in or swelled with a solvent contained in an ink, on a substrate.

In the ink-jet recording system, inks of the type that a dye component is dissolved in a solvent have heretofore been often used. However, in the case where a dye-based ink is used, the resulting print involves a problem that since the print is naturally poor in light fastness and ozone fastness, it undergoes fading or color change when it is stored for a long period of time. Therefore, Japanese Patent Application Laid-Open No. 58-136482 and U.S. Pat. No. 5,374,475 propose recording media in which a porous layer comprising a thermoplastic polymer material is provided on a substrate, and the porous layer is melted by the action of heat and pressure after printing to make the porous layer dense.

Japanese Patent Publication No. 2-31673 proposes a recording medium having an ink-receiving layer of a two-layer structure in which a layer of an inorganic pigment having a great ink-absorbing capacity is formed on a substrate, and an ink-receptive layer comprising an organic thermoplastic polymer is provided as the outermost layer.

On the other hand, pigment inks have been recently been increasingly used in place of the dye-based inks for the purpose of solving the problems of light fastness, water fastness and ozone fastness and providing images of higher optical density, and can also be applied to the ink-jet recording system.

In the case where a pigment ink is used, a problem that the resulting print becomes poor in rub-off resistance and water fastness when the image is exposed on the surface of a recording medium arises because a pigment contained in the ink is not dissolved in a solvent. Therefore, a mechanism that the pigment is captured and fixed is required. There is known a system that a polymeric fixing agent is contained in an ink in addition to a pigment component to fix the pigment by the polymeric fixing agent upon the impact of the ink. However, this system must be still improved to achieve high fixing ability. A recording liquid making combined use of a pigment and a dye is known from the viewpoint of providing images of high optical density.

Media suitable for pigment inks have been proposed in Japanese Patent Application Laid-Open Nos. 8-230308, 9-30116, 9-66660 and 9-123593.

Figure 9:
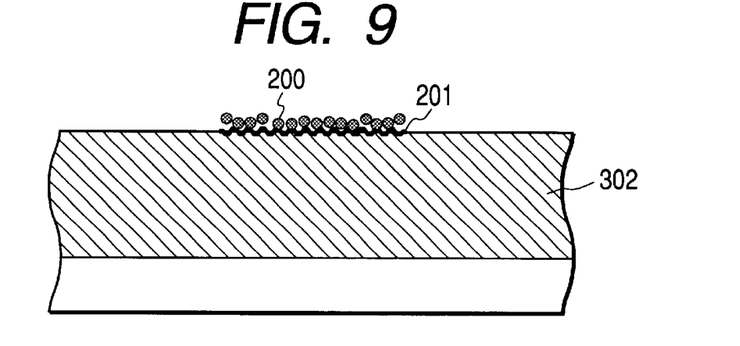
FIG. 9 illustrates an exemplary print obtained by printing with a pigment ink on a conventional recording medium.
Figure 10:
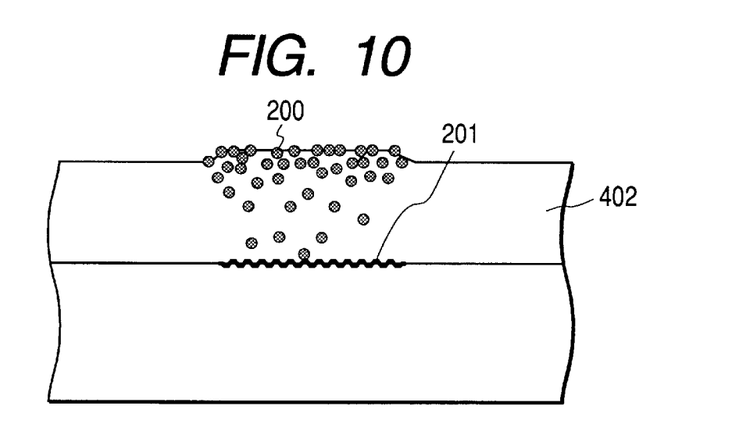
FIG. 10 is an enlarged cross-sectional view illustrating another exemplary print obtained by a conventional recording method.

However, the above-described prior arts have involved the following problem. Since a marked difference in particle and molecular sizes lies between pigments and dyes, mechanisms of fixing or adsorbing them differ greatly. Therefore, recording media suitable for use in dye-based inks are not always applicable to pigment inks. For example, when printing is conducted on the recording medium described in Japanese Patent Application Laid-Open No. 2-276670, portions, on which a pigment 200 and a dye 201 are deposited and exposed on the surface of the recording medium 302 as illustrated in FIG. 9, are formed when respective inks are ejected in great amounts, so that sufficient rub-off resistance and water fastness cannot be achieved in the resulting image. When printing is conducted on the recording medium described in Japanese Patent Application Laid-Open No. 4-101880, the viscosity and strength of the resin portion are continuously reduced due to the dissolution or swelling of the resin portion in or with a solvent in an ink, and ink-absorbing speed is slowed, so that its sticking and separation by contact occur. In addition, the color density of the resulting image is also insufficient. When printing is conducted on the recording medium described in Japanese Patent Application Laid-Open No. 58-136482 or U.S. Pat. No. 5,374,475, coloring materials, both pigment component and dye component, are trapped in a microporous layer through a microporous structure. Therefore, the pigment component 200 large in particle diameter is dispersed and arranged by halves in pores in the resin layer 402 as illustrated in FIG. 10, so that the optical density of the resulting image cannot be enhanced even when the amount of the ink is increased.

The recording medium described in Japanese Patent Publication No. 2-31673 is designed so as to achieve a more sufficient ink-absorbing capacity, but not intended to be applicable to pigment inks as well. More specifically, since correlation between a pigment and the size of pores in the resin layer is not optimized, the pigment component in the pigment ink is dispersed and arranged in pores in the resin layer provided on the inorganic pigment layer, so that the optical density of the resulting image cannot be enhanced even when the amount of the ink is increased.

Some problems are involved in the above-described media suited to pigment inks as well.

In Japanese Patent Application Laid-Open No. 8-230308, a porous undercoat layer having a pore size of the submicron order is provided on a substrate, and an overcoat layer containing plastic beads and having pores of the micron order is provided thereon to trap a pigment forming an image in the pores of the micron order in the overcoat layer. However, since the pigment trapped is dispersed in a vertical direction of the overcoat layer to penetrate thereinto, it is difficult to realize a high optical density of image. In addition, since the pigment only penetrates into the pores in the overcoat layer, and is not fixed, the recording medium has a problem that the resulting print is lacking in long-term reliability upon its storage.

Figure 11:
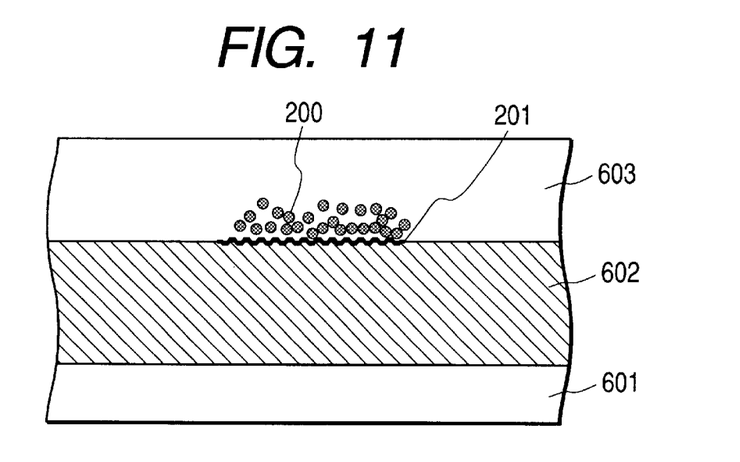
FIG. 11 illustrates a further exemplary print obtained by another conventional recording method.

In Japanese Patent Application Laid-Open No. 9-30116, a surface layer 603 having pores through which a pigment 200 passes, and an ink-holding layer 602 are provided on a transparent substrate 601 as illustrated in FIG. 11. In this medium, the pore volume and pH of the surface layer are adjusted so as to conduct printing with a pigment ink from the side of the surface layer 603, and an image formed is observed from the side of the transparent substrate 601. However, the medium involves a problem that when characters are printed, an apparatus for printing reflected-image characters and a pretreatment of the image are required. In addition, since the surface layer 603 has the pores of the size that the pigment can pass through, the transparency of the surface layer 603 is lowered, and so the medium has been not suitable for a recording medium of the transmission type such as OHP.

In Japanese Patent Application Laid-Open No. 9-66660, a porous alumina hydrate layer is provided as a lower layer on a substrate, and another porous layer having a smaller average pore diameter than the porous alumina hydrate layer is provided thereon. In this medium, the upper layer controls an ink-absorbing speed to uniformly disperse and absorb a pigment ink. However, the ink-absorbing speed of the upper layer is slow, and so problems such as feathering have arisen when a large amount of the ink is ejected.

In Japanese Patent Application Laid-Open No. 9-123593, a porous alumina hydrate layer having a thickness of 1 to 200 $\mu$m is provided on a substrate, and a water-soluble resin layer having a thickness of 0.01 to 50 $\mu$m is provided thereon to absorb a solvent in an ink and swell, thereby moderately controlling a drying speed. However, this medium has problems that the medium takes a long time from the swelling to the drying, and that feathering occurs when a large amount of the ink is ejected.

SUMMARY OF THE INVENTION

With the foregoing problems in view, it is an object of the present invention to provide an ink-jet recording method, by which even when a pigment ink comprising a pigment component as a coloring material is used, the pigment can be uniformly fixed to achieve a high optical density of image, and a print obtained by such an ink-jet recording method.

The above object can be achieved by the present invention described below.

According to the present invention, there is thus provided an ink-jet recording method in which recording is conducted with an ink comprising a pigment component on a recording medium comprising a substrate and a porous layer including polymer particles provided thereon, the method comprising, in the case where the pore diameter distribution of the porous layer including polymer particles and the particle diameter distribution of the pigment component are both expressed in terms of frequency distribution, controlling a proportion of the frequency of the pore diameter of the porous layer including polymer particles, which overlaps the particle diameter distribution of the pigment component, to the frequency of the whole pore diameter of the porous layer including polymer particles to from 0.1% to 10% to form an image; and heat-treating the porous layer including polymer particles after the formation of the image.

According to the present invention, there is also provided a print on a recording medium comprising a substrate and a polymer resin layer provided on the substrate, wherein a pigment component in an ink is fixed in the vicinity of the surface of the polymer resin layer, and a dye component in the ink is fixed on the substrate.

According to the present invention, there is further provided a print on a recording medium comprising a substrate, a porous layer including inorganic pigment and a polymer resin layer successively formed on the substrate, wherein a pigment component in an ink is fixed in the vicinity of the surface of the polymer resin layer, and a dye component in the ink is fixed into the porous layer including inorganic pigment.

DESCRIPTION OF THE PREFERRED EMBODIMENTS

A feature of the present invention resides in an ink-jet recording method, by which when printing is conducted with an ink comprising a pigment component as a main component of a coloring material, the pigment is uniformly fixed to achieve a high optical density of image. Another feature resides in a print which has excellent water fastness and light fastness, is capable of being stored for a long period of time and achieving good rub-off resistance though an ink relatively high in pigment concentration is used, satisfactorily exhibits the effects brought about by enhancing the concentration of a pigment in the ink, and realizes a high optical density of image and excellent color tone. The present invention has been completed by further investigating findings obtained by experiments by the present inventors.

The present invention will hereinafter be described by the preferred embodiments.

Figure 1:
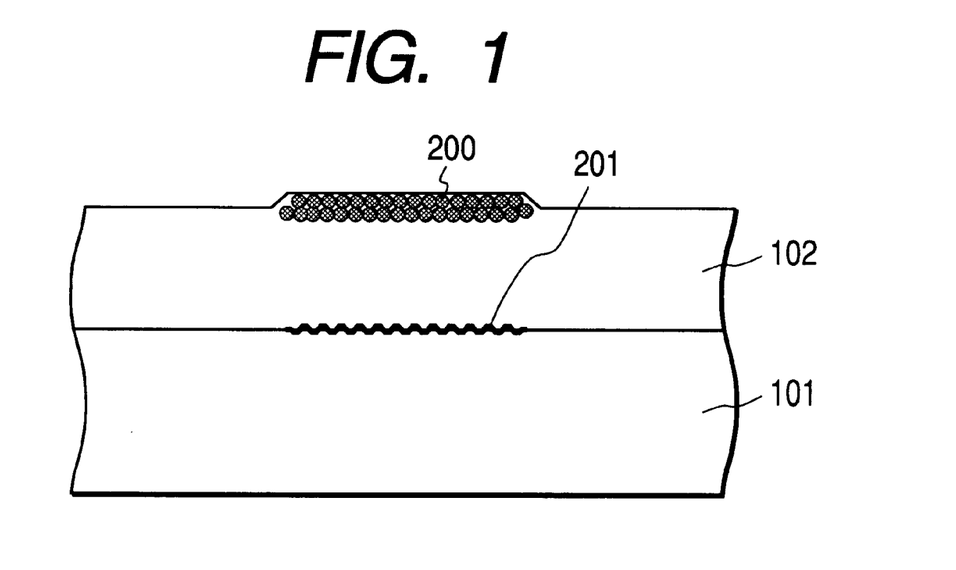
FIG. 1 is a cross-sectional view illustrating an exemplary print obtained by printing with a pigment ink on a recording medium according to the ink-jet recording method of the present invention.
Figure 2:
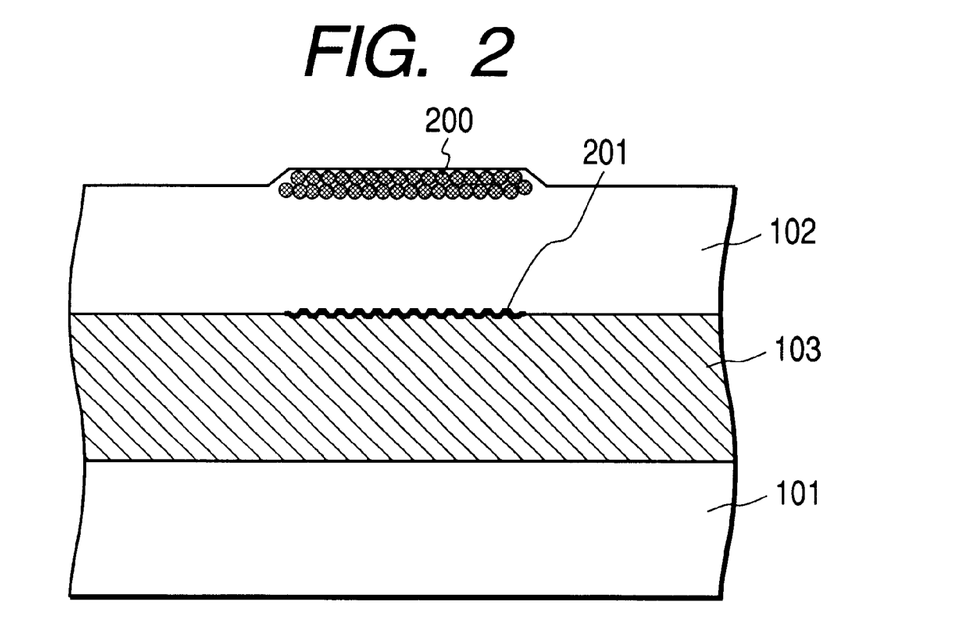
FIG. 2 is a cross-sectional view illustrating another exemplary print obtained by printing with a pigment ink on a recording medium according to the ink-jet recording method of the present invention.

FIGS. 1 and 2 illustrate examples of the print according to the present invention. In FIG. 1, reference numeral 101 indicates a substrate, 102 is a polymer resin layer formed into a film by heating a porous layer including polymer particles, 200 is a pigment component fixed, and 201 is a dye component fixed. Referring to FIG. 2, a porous layer including inorganic pigment 103 is provided between the substrate 101 and the polymer resin layer 102, in which the pigment component is fixed in the vicinity of the surface of the resin layer 102, and the dye component 201 is fixed on the porous layer including inorganic pigment 103.

In the present invention, the pigment component 200 in the ink is uniformly arranged and fixed in the vicinity of the surface of the polymer resin layer 102. Therefore, the transmission of light through the image is prevented as much as possible even when printing is conducted over a wide range like solid printing, so that a print on which an image of high optical density has been formed can be obtained. Since the polymer resin layer 102 is transparent, a print also usable for OHP and the like making good use of optical transmission is provided. The term "transparent polymer resin layer" as used herein means a layer having a light transmittance of at least 50%, preferably 85% or higher. In addition, since the dye component is fixed on the substrate 101 or the porous layer including inorganic pigment 103, the optical density of image is further enhanced to achieve excellent color tone, and moreover the fading or color change that characteristically occurred in the dye component can be prevented because the dye component is covered with the polymer resin layer 102. Since the polymer resin layer 102 is formed by heat-treating a porous layer including polymer particles to make it dense, a molten resin penetrates into the pigment component uniformly arranged at the same time as the densification, and the resin and pigment component strongly unite after cooling, so that the print comes to have high rub-off resistance and water fastness.

Figure 3:
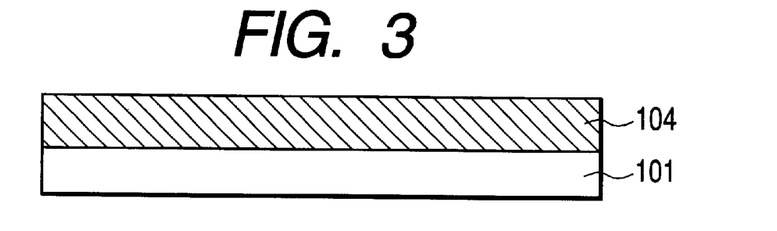
FIG. 3 is a cross-sectional view illustrating an exemplary recording medium used in the present invention.
Figure 4:
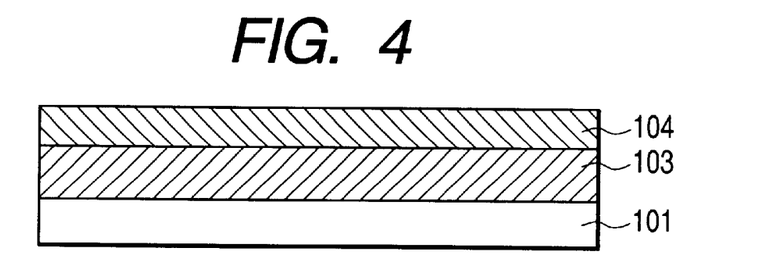
FIG. 4 is a cross-sectional view illustrating another exemplary recording medium used in the present invention.

Recording media used for providing such prints as illustrated in FIGS. 1 and 2 are those illustrated in FIGS. 3 and 4, respectively. In FIGS. 3 and 4, reference numeral 104 indicates the porous layer including polymer particles to be formed into the polymer resin layer by heating. Reference numerals 101 and 103 are a substrate and a porous layer including inorganic pigment, respectively.

Figure 5:
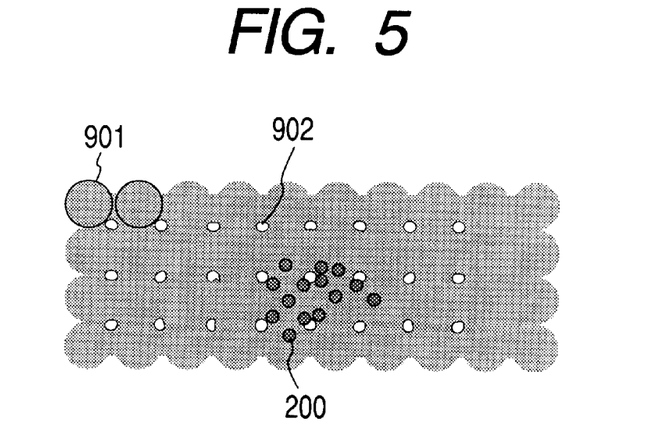
FIG. 5 is a plan view illustrating an example of the relationship between a pigment in an ink and a porous layer including polymer particles of a recording medium.

FIG. 5 schematically illustrates the porous layer including polymer particles viewed from the ink-impact surface. The porous layer including polymer particles is formed in a porous matrix structure. Voids in the porous matrix structure correspond to pores. In FIG. 5, reference numeral 901 indicates a polymer resin particle, 902 is a pore, and 200 is a pigment component impacted.

Figure 6:
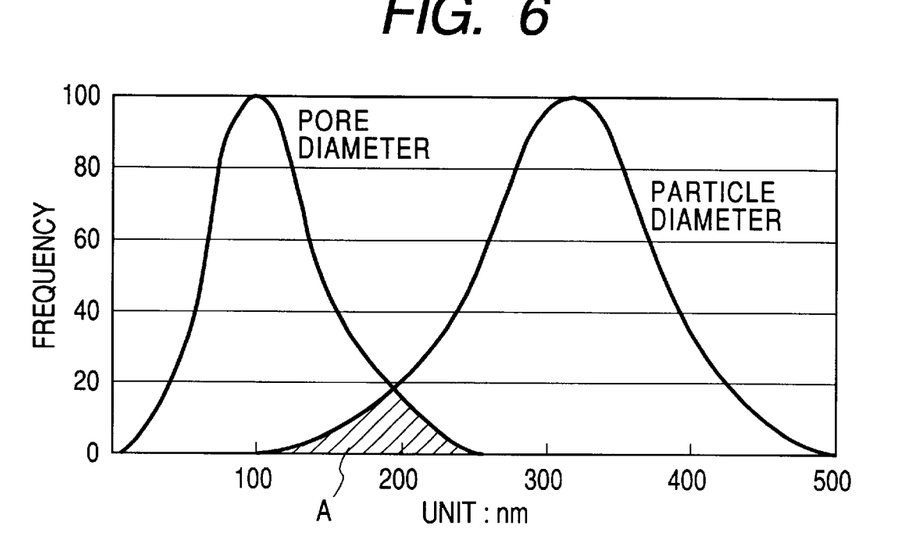
FIG. 6 diagrammatically illustrates an example of the relationship between the particle diameter of a pigment component in an ink used in the present invention and the pore diameter of a porous layer including polymer particles.

When an ink is impacted on the porous layer including polymer particles according to the present invention, a solvent in the ink passes through the pores 902 to be absorbed into the porous layer including polymer particles since the relationship between the pore diameter of the porous layer including polymer particles and the particle diameter of the pigment component in the ink is optimized. However, the pigment component 200 does not pass through the pores, but is adsorbed and arranged in the vicinity of the surface of the porous layer including polymer particles. Namely, the porous layer including polymer particles 104 functions as a layer that is permeated by the solvent in the ink and moreover as a pigment component-retaining layer for fixing the pigment component. More specifically, the resin layer plays a role of a "filter" that is permeated by water (solvent) in the ink, but not permeated by the pigment component. At this time, if the relationship between the pore diameter of the porous layer including polymer particles and the particle diameter of the pigment component is expressed by the pore diameter distribution of the porous layer including polymer particles and the particle diameter distribution of the pigment component, the role as "filter" is developed by controlling the degree of overlapping between both distributions in terms of frequency distribution as illustrated in FIG. 6. More specifically, even when the ink contains a great amount of a pigment component having a relatively small particle diameter in the particle diameter distribution, the effect of the filter that the pigment component is successfully held and arranged, and the solvent permeates is achieved by controlling a proportion of the frequency (frequency of an area A) of the pore diameter of the porous layer including polymer particles, which overlaps the particle diameter distribution of the pigment component, to the frequency of the whole pore diameter of the porous layer including polymer particles to from 0.1% to 10%. If the proportion is lower than 0.1%, the permeation of the solvent in the ink is inhibited. If the proportion is higher than 10%, the effect for uniformly arranging the pigment component is lowered. It is more preferred that the degree of overlapping be 5% or lower.

It is preferred that the pore diameter of the porous layer including polymer particles be within a range of from 10 to 300 nm. If the pore diameter is smaller than 10 nm, the absorbing speed of the resulting recording medium cannot be enhanced. If pores of greater than 300 nm are present, the degree of overlapping with the particle diameter of the pigment component in the ink is increased, so that the effect for uniformly arranging the pigment component is lowered.

The pores in the porous layer including polymer particles may be distributed in such a manner that their pore diameters are gradient from a surface layer portion through an intermediate layer portion to a lower layer portion. In particular, when the pore diameter of the porous layer including polymer particles within a range of from the surface of the porous layer including polymer particles to the depth of 5 $\mu$m is controlled to 100 nm or smaller, the effect for uniformly arranging the pigment component in the vicinity of the surface of the porous layer including polymer particles is further enhanced. In addition, when the pigment component is controlled to be present within a depth of 1 $\mu$m from the surface, the optical density of an image formed on the resulting recording medium can be further enhanced. Incidentally, the measurement of the pore diameter distribution is conducted in accordance with the mercury intrusion porosimetry [the details are described in literature such as E. W. WASHIBURN, Proc. Natl. Acad. Sci. 7, p. 115 (1921)] after vacuum-drying a recording medium sample obtained by forming a porous layer including polymer particles on a PET film for at least 24 hours. The calculation of a pore diameter is conducted in accordance with the method by Barrett et al. [J. Am. Chem. Soc. 73, 373 (1951)].

On the other hand, the term "particle diameter of the pigment component" as used herein substantially means a diameter of an aggregate of primary particles. The particle diameter distribution of the pigment component used in an ink-jet system is generally within a range of from 30 to 500 nm, preferably from 60 to 200 nm. In the present invention, the particle diameter of pigment particles is measured in accordance with the centrifugal sedimentation method.

Such pores in the porous layer including polymer particles as described above can be obtained by optimizing the relationship among the kind and particle diameter of polymer resin particles used, drying conditions, film thickness and the like.

In the present invention, particles of a thermoplastic resin are used to form the porous layer including polymer particles. The resin particles are used in the form of an aqueous or non-aqueous dispersion or suspension, or a colloidal solution in a solvent or water.

Examples of such resin particles include particles of polyester, polyethylene, polyurethane, styrene-acrylic copolymers, polyacrylic acid esters, polymethacrylic acid esters, ethylene-vinyl acetate copolymers, polystyrene and polyvinyl chloride. However, the present invention is not limited to these resins. Besides, those obtained by modifying these resins, and copolymers of these resins with other monomers may be used. These resins may be used either singly or in any combination thereof as desired.

The form of the resin particles may be either spherical or needle. However, they are preferably in the form near a sphere in order to form a porous layer including polymer particles having more uniform pores.

The resin particles preferably have an average particle diameter of 0.1 $\mu$m to 5.0 $\mu$m. If the average particle diameter of the resin particles is smaller than 0.1 $\mu$m, any pore having a pore diameter of 10 nm or greater cannot be obtained, so that no porous layer including polymer particles having good ink absorbency and ink permeability can be provided. Therefore, the resulting recording medium causes ink overflowing and feathering or bleeding upon printing. If the average particle diameter of the resin particles exceeds 5.0 $\mu$m, pores having a pore diameter of 300 nm or greater come to exist in plenty in the resulting porous layer including polymer particles. Therefore, upon printing, a part or a considerably large amount of a pigment component in an ink diffuses in the interior of the porous layer including polymer particles, and so the pigment component cannot be trapped and arranged in the vicinity of the surface of the porous layer including polymer particles. Therefore, the image formed becomes low in color density and dull because the pigment component is present with scatter. The average particle diameter of the resin particles is more preferably within a range of from 0.2 $\mu$m to 3.0 $\mu$m.

The minimum film-forming temperature of the resin particles is preferably within a range of from 40° C. to 150° C. The minimum film-forming temperature means the minimum temperature at which the resin particles can be formed into a uniform film when they are applied and heated. In the present invention, the resin particles are uniformly applied to form a porous layer including polymer particles. Therefore, it is necessary to heat and dry the coating layer under such conditions that the resin particles are fusion-bonded to one another to a degree that the coating layer has a certain film strength, so as to form a porous matrix structure. In the present invention, the porous matrix structure is such that the polymer resin particles are partially bonded to one another by heating to form a matrix structure, and voids among the particles other than the matrix are utilized to absorb an ink, and is different from the structure of the porous layer including inorganic pigment, in which inorganic particles themselves have pores, and the pores are utilized to absorb the ink. Therefore, if the minimum film-forming temperature is lower than 40° C., the resin particles tend to be formed into a dense film when they are applied and dried, so that the porosity is lost. As a result, the permeation of not only the pigment component in the ink, but also water is prevented, and so the resulting recording medium causes ink overflowing and feathering or bleeding upon printing. In order to prevent such resin particles from being formed into a dense film, the drying temperature may be lowered. However, a solvent in the dispersion or colloidal solution coated becomes hard to be dried, so that it takes a long time to dry the coating layer. If the minimum film-forming temperature exceeds 150° C., it is necessary to conduct a heat treatment after formation of an image at a high temperature, so that problems of decomposition, oxidation and/or coloring of the substrate, porous layer including inorganic pigment, and pigment and dye in the ink arise. The more preferable minimum film-forming temperature is from 50° C. to 130° C.

The thickness of the porous layer including polymer particles is preferably from 1 $\mu$m to 40 $\mu$m. If the thickness is smaller than 1 $\mu$m, such a resin film cannot fulfill the role as the ink-absorbing layer, and moreover its function of fixing the pigment component is also lowered. More specifically, the reason why a pigment component in an ink can be fixed in the present invention is as follows. When printing is conducted with the ink, the ink is first uniformly arranged in the vicinity of the surface of the porous layer including polymer particles. As the quantity of the ink ejected, or the concentration of the pigment component is increased, the pigment component itself more closely overlaps each other on the surface of the porous layer including polymer particles after impact of the ink, whereby the pigment component is uniformly arranged with a dense layer formed. At this point of time, the resin particles of the resin layer are not bonded to the pigment component. When the printed area is rubbed in this state, the arranged pigment component is naturally separated. In the present invention, however, the resin particles forming the porous layer including polymer particles are melted around the pigment component uniformly arranged by heating after the printing, and bonded to the pigment component. At this time, the resin particles are not enough to be bonded to the pigment component if the thickness of the porous layer including polymer particles is not sufficient, so that an unfixed pigment component remains. In the present invention, the viscosity of the resin particles is lowered by the heating, so that the resin particles penetrate in a molten state into voids defined among the particles of the pigment component arranged to fulfill the role of a binder to bond the particles of the pigment component to each other. The molten resin particles are allowed to penetrate into the voids of the pigment component in the ink sufficiently and to cover further the surface of the pigment component sufficiently, by forming the porous layer including polymer particles in a sufficient thickness. When an ink containing a dye component is used, the effects of the resin layer on light fastness and ozone fastness are also reduced if the thickness is too thin. On the other hand, if the resin layer is too thick, it may crack in some cases upon drying, so that its strength is lowered, and the evenness of the coating film is impaired. As a result, the transparency thereof, and the brightness of an image formed on the resulting recording medium are also lowered. The thickness of the porous layer including polymer particles is more preferably from 3 μm to 30 μm.

The heat treatment for making the porous layer including polymer particles dense is carried out in a hot-air drying oven or infrared drying oven, or on a hot plate, which is commonly used. These devices may be used in combination. The heating may be conducted from the front side, back side or both sides of a print. Pressing may be used in combination with the heat treatment. At this time, the melting by the heat treatment is facilitated by the pressing. Therefore, the densification of the resin layer is accelerated, so that the treatment can be conducted in a shorter period of time. Specifically, a coated substrate is passed through heated rolls used in lamination and the like and then through cooling rolls to complete the heat treatment. When the surface of each roll is planished, a smoother surface may be provided. When the surface of each roll is roughened on the other hand, a matted surface may also be provided.

No particular limitation is imposed on the concentration of the polymer resin particles in a coating formulation. However, the resin particles may be suitably used in a concentration of 5 to 50% by weight. A small amount of a polymer component functioning as a binder may be added to the polymer resin particles.

No particular limitation is imposed on the coating method of the polymer resin particles, and the coating may be conducted by a roll coater, air knife coater, blade coater, bar coater, gravure coater, rod coater or the like. The drying is conducted at a temperature lower than the minimum film-forming temperature of the polymer resin particles by a hot-air drying oven, infrared drying oven or the like commonly used, or any combination thereof.

No particular limitation is imposed on the substrate 101 used, and various kinds of substrates may be used. Examples of usable substrates include paper webs such as suitably sized paper, water leaf paper and resin-coated paper, resin films or sheets, cloths, glass and metals. In the case of the resin films or sheets, transparent films or sheets composed of polyester, polystyrene, polyvinyl chloride, polymethyl methacrylate, cellulose acetate, polyethylene or polycarbonate, as well as opaque films or sheets opacified by the filling of an alumina hydrate, titanium white or the like, or the formation of minute foams may be used. When a transparent film is used as the substrate, the resulting recording medium can also be used as a sheet for OHP (overhead projector) or in the formation of medical images as an X-ray film or the like. When an opaque plastic film containing a white pigment, or paper is used as the substrate, the resulting recording medium can also be used in a field of photographic images like photoprints. Further, various kinds of color pigments may be contained in a substrate to make it translucent or colored, thereby controlling the color tone of the whole image.

The substrate may be subjected to a surface treatment such as a corona discharge treatment for improving its adhesiveness to the ink-receiving layer, or provided with an easy-adhesive layer as an undercoat. Further, a curl-preventing layer such as a resin layer or a pigment layer for preventing curling may be provided on the back surface of the substrate or at a desired position thereof.

No particular limitation is imposed on the thickness of the substrate as well. However, it is preferably from 5 μm to 500 μm. The thickness of the substrate may be suitably selected as necessary for the end application intended.

As a recording medium capable of realizing higher image density and higher gradation, there is considered a recording medium comprising a substrate 101, and a porous layer including inorganic pigment 103 and a porous layer including polymer particles 104 successively formed on the substrate 101 as illustrated in FIGS. 2 and 4. When the recording medium illustrated in FIG. 4 is used in the present invention, high absorbing ability is achieved because the relationship between the absorbing capacity and absorbing speed of the porous layer including polymer particles 104 and the porous layer including inorganic pigment 103 is optimized. Namely, the recording medium can also be used in printing by a printer from which a great amount of an ink is ejected. Therefore, an image high in optical density of image and gradation can be provided. More specifically, the absorbing capacity of the porous layer including inorganic pigment 103 of a lower layer is made greater than that of the porous layer including polymer particles 104 of an upper layer, whereby most of a solvent is absorbed in the porous layer including inorganic pigment 103, so that the solvent is prevented from running in lateral directions in the porous layer including polymer particles 104. A dot diameter of the ink impacted can be optimized by adjusting the balance of ink absorption among all the layers in such a manner, so that the high optical density of image obtained by the pigment component can be secured without any impairment. Besides, the absorbing speed of the porous layer including polymer particles 104 of the upper layer is made higher than that of the porous layer including inorganic pigment 103 of the lower layer, whereby the solvent in the ink impacted can be transferred to the lower layer immediately after printing, so that a possibility of feathering at the surface can be further reduced, and an image higher in resolution can be formed.

The porous layer including inorganic pigment 103 functions as an absorbing layer for the solvent component in the ink and moreover as a fixing layer for a dye component when the ink contains the dye component, and assumes most of the ink absorption by the whole ink-absorbing layer of the recording medium. Therefore, it is desirable to have a great ink-absorbing capacity in particular.

In order to secure a sufficient ink-absorbing capacity, it is necessary to adjust the pore diameter of the porous layer including inorganic pigment. At this time, it is desirable that the average pore diameter be 20 nm or smaller, and any pore exceeding 20 nm be substantially not present. If the average pore diameter exceeds 20 nm, light scattering occurs on the resulting porous layer including inorganic pigment, so that the transparency of the recording medium is impaired, and moreover an image formed thereon by printing becomes whitish. Therefore, such a great average pore diameter is not preferred. Incidentally, the pore diameter distribution is determined by the nitrogen adsorption and desorption method.

In order to adjust the absorbing capacity, it is desirable that the total pore volume of the porous layer including inorganic pigment be within a range of from 0.1 to 1.0 cc/g, preferably from 0.4 to 0.6 cc/g. If the pore volume of the porous layer including inorganic pigment is greater than the upper limit of the above range, cracking and dusting tend to occur upon the formation of porous layer including inorganic pigment. If the pore volume is smaller than the lower limit of the above range, the porous layer including inorganic pigment becomes poor in ink absorption. It is also desirable that the pore volume per unit area of the porous layer including inorganic pigment be at least 8 cc/m$^2$. If the pore volume per unit area is smaller than this limit, the ink-absorbing ability assumed by the porous layer including inorganic pigment becomes insufficient, so that inks tend to run out of the porous layer including inorganic pigment when multi-color printing is conducted in particular, and so bleeding occurs on an image formed. The BET specific surface area of the porous layer including inorganic pigment is preferably within a range of from 20 to 450 m²/g. If the BET specific surface area is to small, the haze degree of the porous layer including inorganic pigment increases, so that an image formed thereon tends to wear a white haze. If the BET specific surface area is too great on the other hand, the porous layer including inorganic pigment tends to crack.

The porous layer including inorganic pigment is desirably formed on the substrate as a layer composed of inorganic pigment particles bound by a binder. The inorganic pigment particles are preferably porous particles. The particle diameter thereof is preferably from 20 to 500 nm. For example, when particles having a particle diameter smaller than the lower limit of the above range are used, the resulting porous layer including inorganic pigment may tend to crack in some cases. When particles having a particle diameter greater than the upper limit of the above range are used on the other hand, light scattering occurs on the resulting porous layer including inorganic pigment, so that the haze degree thereof increases, and an image formed thereon becomes whitish as a whole. Specific examples of the inorganic pigment include calcium carbonate, kaolin, talc, calcium sulfate, barium sulfate, titania, zinc oxide, zinc carbonate, aluminum silicate, alumina hydrate, silicic acid, sodium silicate, magnesium silicate, calcium silicate and silica. These pigments may be used either singly or in any combination thereof.

Examples of a pigment preferably used from the viewpoints of ink absorbency and resolution in particular include silica and alumina hydrate. As the silica, there may be used any of natural silica, synthetic silica, amorphous silica and chemically modified silica compounds. However, silica having a positive charge is particularly preferred.

Since the alumina hydrate has a positive charge, a dye in an ink is well fixed thereto, and an image high in gloss and good in coloring can hence be provided. In addition, an ink-receiving layer comprising such an alumina hydrate has a low haze degree and high transparency compared with ink-receiving layers using another pigment. Therefore, the alumina hydrate is more preferred as a pigment used for the porous layer including inorganic pigment.

The alumina hydrate used in the present invention is represented by the general formula $$Al_2O_{3-n}(OH)_{2n} \cdot mH_2O$$

wherein n is an integer of 0, 1, 2 or 3, and m is a number of 0 to 10, preferably 0 to 5. In many cases, mH₂O represents an aqueous phase which does not participate in the formation of a crystal lattice, but is able to be eliminated. Therefore, m may take a value other than an integer. Besides, m may take a value of 0 when this kind of alumina hydrate is calcinated.

As an alumina hydrate useful in the practice of the present invention, an alumina hydrate described in Japanese Patent Application Laid-Open Nos. 5-125437, 5-125438, 5-125439 or 6-114571 may preferably be used.

The pore properties of the alumina hydrate are adjusted in the course of its production. In order to meet the BET specific surface area and pore volume required of the porous layer including inorganic pigment, it is preferred to use an alumina hydrate the pore volume of which is within a range of from 0.1 to 1.0 ml/g. If the pore volume of the alumina hydrate is outside the above range, it is difficult to adjust the pore volume of the porous layer including inorganic pigment within the above-specified range.

An alumina hydrate having a BET specific surface area within a range of from 40 to 500 m²/g is preferably used. If the BET specific surface area of the alumina hydrate is outside the above range, it is difficult to adjust the BET specific surface area of the porous layer including inorganic pigment within the above-specified range.

A binder used in combination with the above pigment is preferably a water-soluble or water-dispersible polymer. Preferable examples thereof include polyvinyl alcohol or modified products thereof (cationically modified, anionically modified, silanol modified), starch or modified products thereof (oxidized, etherified), gelatin or modified products thereof, casein or modified products thereof, gum arabic, cellulose derivatives such as carboxymethyl cellulose, hydroxyethyl cellulose and hydroxypropylmethyl cellulose, conjugated diene copolymer latexes such as SBR latexes, NBR latexes and methyl methacrylate-butadiene copolymers, functional group-modified polymer latexes, vinyl copolymer latexes such as ethylene-vinyl acetate copolymers, polyvinyl pyrrolidone, maleic anhydride polymers or copolymers thereof, and acrylic ester copolymers. These binders may be used either singly or in any combination thereof.

The mixing ratio of the pigment to the binder may be optionally selected from a range of from 1:1 to 30:1, preferably from 5:1 to 25:1 so far as the BET specific surface area and pore volume of the resulting porous layer including inorganic pigment satisfy the above ranges, respectively. If the amount of the binder is less than the lower limit of the above range, the mechanical strength of the resulting porous layer including inorganic pigment becomes insufficient, which is the cause of cracking and dusting. If the amount is greater than the upper limit of the above range, the pore volume of the resulting porous layer including inorganic pigment is reduced, resulting in a recording medium poor in ink absorbency.

A coating formulation is obtained by using the above-described inorganic pigment and binder. This coating formulation is applied to a substrate, whereby the porous layer including inorganic pigment can be formed.

The coating formulation itself preferably has a pH of 3 to 7. When the porous layer including inorganic pigment is formed using a coating formulation having a pH lower than 3, the ink applied to the porous layer including inorganic pigment may tend to undergo color change in some cases. When the pH is higher than 7 on the other hand, the coating formulation tends to increase its viscosity, and so its stability with time may be deteriorated in some cases.

To the coating formulation, there may be further added a dispersing agent, thickener, pH adjuster, lubricant, flowability modifier, surfactant, antifoaming agent, water-proofing agent, foam suppressor, parting agent, mildewproofing agent and/or the like within limits not impeding the object of the present invention.

The coating formulation on the substrate may be applied by a coating process using, for example, a blade coating system, air-knife coating system, roll coating system, brush coating system, gravure coating system, kiss coating system, die coating system, extrusion system, slide bead (slide hopper) system, curtain coating system or spray coating system.

The coating weight of the coating formulation on the substrate may be suitably selected as necessary for the end application intended. If the coating film is too thin, the resulting porous layer including inorganic pigment fails to sufficiently absorb an ink applied, so that feathering or bleeding occurs on the porous layer including polymer particles of the upper layer. Therefore, such a too thin coating film is not preferred. If the coating film is too thick on the other hand, the strength of the resulting porous layer including inorganic pigment is lowered, and a defective coating film is formed upon applying or drying, so that portions incapable of securing a sufficient ink-absorbing capacity are partially formed in the resulting porous layer. In addition, the transparency of the porous layer is reduced, so that there is a possibility that the transparency of the resulting print or the brightness of an image to be formed on the resulting recording medium may be impaired. Therefore, such a too thick coating film is also not preferred. Thus, in order to secure a good absorbing capacity and keep the strength of an overall film, the thickness of the porous layer including inorganic pigment is preferably within a range of from 5 to 50 $\mu$m.

The coating layer provided on the substrate is subjected to a drying treatment by heating as needed, thereby obtaining the porous layer including inorganic pigment. The aqueous medium (dispersing medium) is evaporated by the drying treatment, and at the same time a film is formed by crosslinking or fusion bonding between the alumina hydrate particles and the binder. The conditions of the drying treatment may be suitably determined according to the composition of the coating formulation used. The drying is conducted by a hot-air drying oven, infrared drying oven or the like commonly used, or any combination thereof.

No particular limitation is imposed on pigment inks for ink-jet used in the present invention. An outline thereof will hereinafter be given.

The amount of a pigment component contained in the pigment inks used in the present invention is preferably within a range of from 0.1 to 20% by weight, more preferably from 1 to 12% by weight based on the total weight of the ink. Any pigment may be used in the present invention. For example, as carbon black used in a black ink, worth mentioning are those produced in accordance with the furnace process or channel process and having such properties that the primary particle diameter is from 15 to 40 nm, the specific surface area is from 50 to 300 m$^2$/g as measured by the BET method, the oil absorption is from 40 to 150 ml/100 g as determined by using DBP, the volatile matter is from 0.5 to 10%, and the pH is from 2 to 9. Examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Japan Limited), REGAL 400R, REGAL 330, REGAL 660R and MOGUL L (all, products of Cabot Company), and Color Black FW1, Color Black FW18, Color Black S170, Color Black S150, Printex 35 and Printex U (all, products of Degussa AG). As examples of pigments used in yellow, magenta and cyan inks, worth mentioning are C.I. Pigment Yellow 1, C.I. Pigment Yellow 2, C.I. Pigment Yellow 3, C.I. Pigment Yellow 13, C.I. Pigment Yellow 16, C.I. Pigment Yellow 74 and C.I. Pigment Yellow 83, C.I. Pigment Yellow 142; C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122; and C.I. Pigment Blue 1, C.I. Pigment Blue 2, C.I. Pigment Blue 3, C.I. Pigment Blue 15, C.I. Pigment Blue 15:3, C.I. Pigment Blue 16, C.I. Pigment Blue 22, C.I. Pigment Blue 199, C.I. Vat Blue 4 and C.I. Vat Blue 6, respectively. However, the pigments are not limited to these pigments. Those newly prepared for the practice of the present invention may also be used in addition to the above pigments.

In order to improve the dispersibility of the pigments, a dispersing agent may be added. Examples of the dispersing agent include nonionic surfactants, anionic surfactants and water-soluble resins. When a known easy-dispersing type pigment is used, any dispersing agent may not be added.

It is desirable that the inks used in the present invention be adjusted to neutrality or alkalinity as a whole because the solubility of the water-soluble resin used as the dispersing agent is enhanced, so that the ink can be provided as an ink far excellent in long-term storability. In this case, it is more desirable that the pH be adjusted to a range of from 7 to 10 because too high alkalinity forms the cause that various parts used in an ink-jet recording apparatus may corrode.

The pigment and the water-soluble resin as a dispersing agent as described above are dispersed or dissolved in a liquid medium.

An aqueous medium suitable for the inks used in the present invention is a mixed solvent of water and a water-soluble organic solvent. As the water, it is preferred to use ion-exchanged water such as deionized water, not tap water containing various ions.

As examples of the water-soluble organic solvent optionally used in combination with water, worth mentioning are alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone.

The content of the water-soluble organic solvent in the ink used in the present invention is generally within a range of from 3 to 50% by weight, preferably from 3 to 40% by weight based on the total weight of the ink, while the content of water used is within a range of from 10 to 90% by weight, preferably from 30 to 80% by weight based on the total weight of the ink.

The inks used in the present invention are prepared in the following manner. A pigment and a dispersing agent if needed are first added to an aqueous solution comprising a water-soluble organic solvent and water, and the mixture is stirred. A dispersion treatment is then conducted in accordance with a dispersing technique described below, and as needed, centrifugation is carried out to obtain a desired dispersion. Compounds used in the present invention, or such components as mentioned above, are then added to the dispersion. The resultant mixture is stirred to prepare an ink.

In the preparation process, it is effective to conduct premixing for at least 30 minutes before the aqueous solution containing the pigment is subjected to the dispersion treatment. This premixing operation serves to improve the wettability of the surface of the pigment and facilitate adsorption of a resin on the pigment surface when a water-soluble resin is contained.

Any dispersing machine commonly used may be employed as a dispersing machine used in the present invention. As examples thereof, may be mentioned ball mills, roll mills and sand mills. Of these mills, a high-speed sand mill is preferred. Specific examples thereof include Super Mill, Sand Grinder, Beads Mill, Agitator Mill, Grain Mill, Dyno Mill, Pearl Mill and Coball Mill (all, trade names).

In the present invention, as methods of obtaining a pigment having a desired particle diameter distribution, may be mentioned techniques in which the size of a grinding medium in a dispersing machine is made smaller, in which the packing rate of a grinding medium is made higher, in which processing time is made longer, in which discharging rate is made lower, and in which classification is conducted by filter, centrifugal separator or the like after grinding. Any combination thereof may also be included.

The dye optionally contained in the inks in the present invention may be any of the known water-soluble dyes typified by direct dyes, acid dyes, basic dyes, reactive dyes and food colors. There may be used, for example, direct dyes such as C.I. Direct Black 17, 19, 32, 51, 71; 108 and 146, C.I. Direct Blue 6, 22, 25, 71, 86, 90, 106 and 199, C.I. Direct Red 1, 4, 17, 28 and 83, and C.I. Direct Yellow 12, 24, 26, 86, 98 and 142; acid dyes such as C.I. Acid Black 2, 7, 24, 26, 31, 52, 63, 112 and 118, C.I. Acid Blue 9, 22, 40, 59, 93, 102, 104, 113, 117, 120, 167, 229 and 234, C.I. Red 1, 6, 32, 37, 51, 51, 52, 80, 85, 87, 92, 94, 115, 180, 256, 317 and 315, and C.I. Acid Yellow 11, 17, 23, 25, 29, 42, 61 and 71; and besides C.I. Basic Black 2, C.I. Basic Blue 1, 3, 5, 7, 9, 24, 25, 26, 28 and 29, and C.I. Basic Red 1, 2, 9, 12, 13, 14 and 37; and Food Black 2.

The above-mentioned dyes are examples of dyes particularly preferred for the inks applicable to the recording method of the present invention. The dyes for the inks used in the present invention are not limited to these dyes. The content of these dyes in the inks is preferably within a range of from 0.5 to 4.0% by weight.

The present invention will hereinafter be described more specifically by the following Examples. However, the present invention is not limited to these examples.

Incidentally, all designations of "part" or "parts" and "%" as will be used in the following examples mean part or parts by weight and % by weight unless expressly noted.

EXAMPLE 1

A transparent PET film (100Q80D, trade name, product of Toray Industries, Inc., transmittance: 88.74%) having a thickness of 100 μm was used as a substrate. In order to form a porous layer including inorganic pigment on this substrate, a coating dispersion was prepared in accordance with the following process. Aluminum dodeoxide was first hydrolyzed to prepare an alumina slurry. Water was added to the alumina slurry until the solids content of alumina hydrate reached 7.9%. After a 3.9% nitric acid solution was then added to this slurry to adjust the pH of the slurry, the slurry was aged to obtain colloidal sol. This colloidal sol was spray-dried at 75° C. to obtain an alumina hydrate. The alumina hydrate was dispersed in ion-exchanged water to prepare a 15% aqueous dispersion. Polyvinyl alcohol (Gohsenol NH18, trade name, product of The Nippon Synthetic Chemical Industry Co., Ltd.) was then dissolved in ion-exchanged water to obtain a 10% aqueous solution. The alumina hydrate dispersion and the polyvinyl alcohol solution were mixed so as to give a mixing ratio of 10:1 by weight, and the resultant mixture was stirred to prepare a coating dispersion. This coating dispersion was die-coated on the substrate using a coater and an hot-air drying oven and then dried (drying temperature: 140° C.), thereby forming a porous layer including inorganic pigment having a thickness of 35 μm. In this case, the pore diameter of the coating layer was 8 to 18 nm.

A porous layer including polymer particles was then formed in the following manner. A coating formulation composed of an aqueous dispersion of a polyester resin (average particle diameter of resin in emulsion: 1.0 μm; minimum film-forming temperature: 100° C.; glass transition temperature: 57° C.; solids concentration: 30.0%) was die-coated on the porous layer including inorganic pigment using a coater and a hot-air drying oven and then dried (drying temperature: 60° C.) to form a porous layer including polymer particles having a thickness of 18 μm, thereby obtaining a recording medium. In this case, the pore diameter of the coating layer was 30 to 100 nm.

Figure 7:
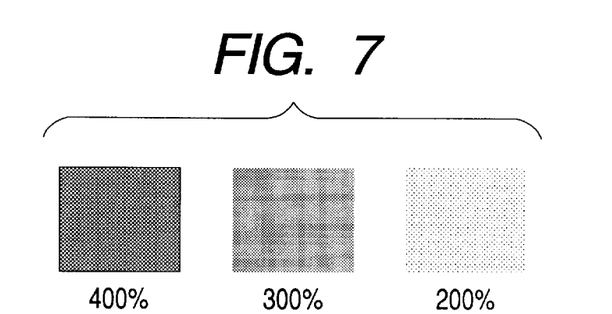
FIG. 7 illustrates examples of a printing pattern for evaluation used in Examples of the present invention.
Figure 8:
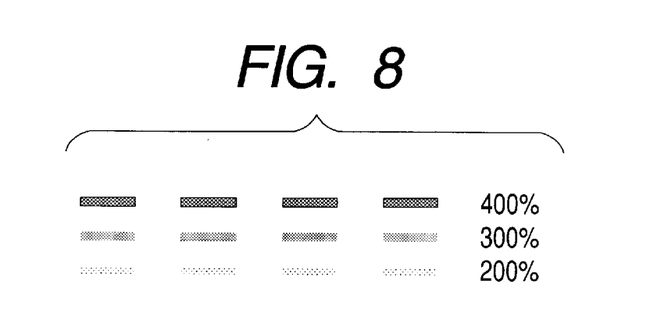
FIG. 8 illustrates other examples of a printing pattern for evaluation used in Examples of the present invention.

A solid pattern illustrated in FIG. 7 and a linear pattern illustrated in FIG. 8 were printed on the recording medium thus obtained by means of an ink-jet printer equipped with a feeding mechanism. In this case, as the ink-jet printer, an experimental printer equipped with 4 heads each having 64 nozzles the orifice diameter of which was 40×40 μm was used. The printing was conducted at densities of 200%, 300% and 400%.

An ink used was a black single-color pigment ink having the following composition. The aggregate of primary particles of carbon black of the pigment had a particle diameter of 50 to 250 nm.

| | |
|---|---|
| Dispersion of carbon black (MCF88, trade name, product of Mitsubishi Chemical Industries Limited) | 20 parts |
| Diethylene glycol | 5 parts |
| Glycerol | 1 part |
| Ion-exchanged water | 68 parts |
| Isopropyl alcohol | 1 part. |

In the recording medium, the degree of overlapping between the pore diameter distribution of the porous layer including polymer particles and the particle diameter distribution of the pigment component was 4.3%.

After completion of the printing, the recording medium printed was placed in a hot-air drying oven and held at 140° C. for 1 minute to heat-fix the pigment in the ink, thereby obtaining a print. In this case, the corners of the recording medium were held by a holding jig to prevent the print from curling. After the heat fixing, the print was cooled to room temperature and taken out of the jig.

The recording medium and print were evaluated as to the following items (1) to (7). The evaluation results are shown in Table 1. In the present invention, the test samples were judged to be accepted in the case that there is no rank C in all the evaluation items.

Evaluation (1) Ink-Absorbing Speed (Drying Property)

The time until a print sample before the fixing no longer became smeared even when the printed area of the sample was lightly rubbed with a finger after the printing (single-color ink quantity: 400%) was measured, and the sample was evaluated in accordance with the following standard:

A: Within 10 seconds;
B: Within 60 seconds;
C: Smeared even after 60 seconds.

(2) Absorbing Ability (Resistant to Feathering and Beading)

The printed area of a fixed print sample was visually observed to confirm whether feathering and beading occurred. The absorbing ability of the recording medium sample was evaluated in accordance with the following standard:

AA: Neither feathering nor beading occurred in an ink quantity of 400%;

A: Neither feathering nor beading occurred in an ink quantity of 300%;

B: Neither feathering nor beading occurred in an ink quantity of 200%;

C: Feathering and/or beading occurred even in an ink quantity of 200%.

(3) Ink-fixing Ability (Rub-off Resistance, Water Fastness)

The printed area of a fixed print sample was rubbed with a cloth soaked with water, and the ink-fixing ability of the recording medium sample was evaluated in accordance with the following standard:

A: No change occurred;

C: Pigment attached to the cloth.

(4) Transmission Density (OD) of Image after Treatment

The optical density of image (in a single-color ink quantity of 400%) of the printed area of a fixed print sample was measured from the printed side by means of a Macbeth densitometer RD-918.

(5) Resolution of Print Image

A fixed print sample was projected by an illuminated photo display case (Schaukasten) for film projection to visually observe the projected image. The resolution of the print image was evaluated in accordance with the following standard:

A: A line pattern having a pitch width of 0.2 mm and a thickness of 0.1 mm was clearly resolved;

B: Somewhat distorted;

C: Remarkably distorted.

(6) Storage Stability (Temperature, Humidity)

A fixed print sample was placed in an environmental tester capable of holding at a temperature of 45° C. and a relative humidity of 95% and left to stand for 240 hours, and then the sample was taken out and observed as to print quality and the degree of color change (fading). The storage stability of the print sample was evaluated in accordance with the following standard:

A: No change occurred;

B: Bleeding or fading occurred to a slight extent;

C: Very conspicuous bleeding or absolute fading occurred.

(7) Storage Stability (Light Fastness, Ozone Fastness)

A fixed print sample was left to stand indoors for 3 months to observe the degree of color change (fading). The storage stability of the print sample was evaluated in accordance with the following standard:

A: No change occurred;

B: Fading occurred to a slight extent;

C: Absolute fading occurred.

Comparative Example 1

A recording medium was obtained in exactly the same manner as in Example 1 except that the porous layer including polymer particles was not provided as the upper layer. Printing was continuously conducted on this recording medium by the same ink-jet printer as that used in Example 1, and the ink applied was dried to obtain a print. The recording medium and print were evaluated as to the items (1) to (7) in the same manner as in Example 1. The evaluation results are shown in Table 1.

Comparative Example 2

A recording medium was obtained in exactly the same manner as in Example 1 except that the degree of overlapping between the pore diameter distribution of the porous layer including polymer particles as an upper layer and the particle diameter distribution of the pigment component in the ink was greater. In this case, the average particle diameter of the polyester resin used in the coating formulation for the porous layer including polymer particles of the upper layer was controlled to 6 μm. The drying temperature and the thickness of the resin layer were controlled to 60° C. and 18 μm, respectively. In this case, the pore diameter of the porous layer including polymer particles was from 120 to 360 nm, and the degree of overlapping between the pore diameter distribution of the porous layer including polymer particles and the particle diameter distribution of the pigment component was 58%. Printing was continuously conducted on this recording medium by the same ink-jet printer as that used in Example 1, and the heat fixing was conducted in the same manner as in Example 1 to obtain a print. The recording medium and print were evaluated as to the items (1) to (7) in the same manner as in Example 1. The evaluation results are shown in Table 1.

Comparative Example 3

A recording medium was obtained in exactly the same manner as in Example 1 except that the upper layer was changed to a porous layer including inorganic pigment. In this case, a silica gel layer was formed as the porous layer including inorganic pigment. A silica sol-containing coating formulation, which was composed of silica sol having a primary particle diameter of from 10 to 20 nm and a polyvinyl alcohol copolymer (R-Polymer R-1130, trade name, product of Kuraray Co., Ltd.) having a silanol group and had a solids content of 5% (copolymer/$SiO_2$=0.3), was used to form the silica gel layer. The coating formulation was die-coated on the lower layer by a coater, and then dried at 140° C. to provide the silica gel layer having a thickness of 10 μm as the upper layer, thereby obtaining a recording medium. In this case, the pore diameter of the coating layer was from 5 to 15 nm. Printing was continuously conducted on this recording medium by the same ink-jet printer as that used in Example 1, and the ink applied was dried to obtain a print. The recording medium and print were evaluated as to the items (1) to (7) in the same manner as in Example 1. The evaluation results are shown in Table 1.

Comparative Example 4

A recording medium was obtained in exactly the same manner as in Example 1 except that the upper layer was changed to a water-soluble resin layer. In this case, a 10% aqueous solution of polyvinyl pyrrolidone (PVP K15, trade name, product of Gokyo Trading Co., Ltd.) was used as a coating formulation for forming the water-soluble resin layer. This coating formulation was die-coated on the lower layer at 80° C. by a coater, and then heat-treated at 140° C. to provide a polyvinyl pyrrolidone layer having a thickness of 5 μm as the upper layer, thereby obtaining a recording medium. Printing was continuously conducted on this recording medium by the same ink-jet printer as that used in Example 1, and the ink applied was dried to obtain a print. The recording medium and print were evaluated as to the items (1) to (7) in the same manner as in Example 1. The evaluation results are shown in Table 1.

EXAMPLE 2

A recording medium was obtained in exactly the same manner as in Example 1 except that the porous layer including polymer particles as an upper layer was changed to a layer composed of a polyurethane resin. In this case, an aqueous dispersion of a polyurethane resin (average particle diameter of resin in emulsion: 0.8 $\mu$m; minimum film-forming temperature: 110° C.; glass transition temperature: 53° C.; solids concentration: 30.0%) was used as a coating formulation for obtaining the porous layer including polymer particles of the upper layer. The drying temperature and the thickness of the resin layer were controlled to 60° C. and 18 $\mu$m, respectively. In this case, the pore diameter of the porous layer including polymer particles was from 36 to 112 nm, and the degree of overlapping between the pore diameter distribution of the porous layer including polymer particles and the particle diameter distribution of the pigment component was 5.2%. Printing was continuously conducted on this recording medium by the same ink-jet printer as that used in Example 1, and the heat fixing was conducted in the same manner as in Example 1 to obtain a print. The recording medium and print were evaluated as to the items (1) to (7) in the same manner as in Example 1. The evaluation results are shown in Table 2.

EXAMPLE 3

A recording medium was obtained in exactly the same manner as in Example 1 except that the porous layer including polymer particles as an upper layer was changed to a layer composed of a styrene-acrylic copolymer resin. In this case, an aqueous dispersion of a styrene-acrylic copolymer resin (average particle diameter of resin emulsion: 1.2 $\mu$m; minimum film-forming temperature: 109° C.; glass transition temperature: 53° C.; solids concentration: 30.0%) was used as a coating formulation for obtaining the porous layer including polymer particles as an upper layer. The drying temperature and the thickness of the resin layer were controlled to 60° C. and 18 $\mu$m, respectively. In this case, the pore diameter of the porous layer including polymer particles was from 41 to 124 nm, and the degree of overlapping between the pore diameter distribution of the porous layer including polymer particles and the particle diameter distribution of the pigment component was 6.4%. Printing was continuously conducted on this recording medium by the same ink-jet printer as that used in Example 1, and the heat fixing was conducted in the same manner as in Example 1 to obtain a print. The recording medium and print were evaluated as to the items (1) to (7) in the same manner as in Example 1. The evaluation results are shown in Table 2.

EXAMPLE 4

A recording medium was obtained in exactly the same manner as in Example 1 except that the porous inorganic particle resin layer as a lower layer was changed to a porous silica gel layer, and colloidal silica (Adelite CT-100, trade name, product of Asahi Denka Kogyo K.K.) was used as inorganic particles. In this case, the thickness and pore diameter of the inorganic particle layer as a lower layer was 30 $\mu$m, and from 6 to 24 nm, respectively. For the porous layer including polymer particles as an upper layer, a polyester resin layer having a thickness of 18 $\mu$m was formed in the same manner as in Example 1 to obtain a recording medium. Printing by the ink-jet printer and the heat fixing were conducted in the same manner as in Example 1 to obtain a print. The recording medium and print were evaluated as to the items (1) to (7) in the same manner as in Example 1. The evaluation results are shown in Table 2.

EXAMPLE 5

A recording medium was obtained in exactly the same manner as in Example 1 except that the layer structure was changed to a structure that a polyester layer was formed directly on a substrate without providing any lower layer. In this case, the thickness of the polyester layer was controlled to 40 $\mu$m. Incidentally, the pore diameter of the porous layer including polymer particles was within a range of from 30 to 96 nm, and the degree of overlapping between the pore diameter distribution of the porous layer including polymer particles and the particle diameter distribution of the pigment component was 4.6%. Printing by the ink-jet printer and the heat fixing were conducted in the same manner as in Example 1 to obtain a print. The recording medium and print were evaluated as to the items (1) to (7) in the same manner as in Example 1. The evaluation results are shown in Table 2.

EXAMPLE 6

An experiment was conducted in the same manner as in Example 1 except that a pigment- and dye-containing ink prepared by adding a dye component as a shading material to the pigment ink used in Example 1 was used. A porous alumina layer as a lower layer and a polyester resin layer as an upper layer were formed in the same manner as in Example 1 to obtain a recording medium. The ink used was an ink containing 1.0% of C.I. Food Black 2 as a dye component. Printing by the ink-jet printer and the heat fixing were conducted in the same manner as in Example 1 to obtain a print. The recording medium and print were evaluated as to the items (1) to (7) in the same manner as in Example 1. The evaluation results are shown in Table 2.

EXAMPLE 7

An experiment was conducted in the same manner as in Example 1 except that the pigment ink was changed to inks of yellow, magenta and cyan colors. A porous alumina layer as a lower layer and a polyester resin layer as an upper layer were formed in the same manner as in Example 1 to obtain a recording medium. C.I. Pigment Yellow 74, C.I. Pigment Blue 15 and C.I. Pigment Red 112 were used as pigment components to prepare the respective pigment inks. In this case, the aggregate of primary particles of each pigment had a particle diameter within a range of from 50 to 300 nm, and the degree of overlapping between the pore diameter distribution of the porous layer including polymer particles and the particle diameter distribution of the pigment component was 5.3%.

Printing by the ink-jet printer and the heat fixing were conducted in the same manner as in Example 1 to obtain a print. The recording medium and print were evaluated as to the items (1) to (7) in the same manner as in Example 1. As a result, the recording medium was judged to be accepted like that of Example 1.

EXAMPLE 8

A recording medium was obtained by forming a porous alumina layer as a lower layer and a polyester resin layer as an upper layer in exactly the same manner as in Example 1 except that the substrate was changed to a white polyester film (Lumirror, trade name, product of Toray Industries, Inc.) having a thickness of 100 μm. Printing by the ink-jet printer and the heat fixing were then conducted in the same manner as in Example 1 to obtain a print. The recording medium and print were evaluated as to the items (1) to (7) in the same manner as in Example 1. Incidentally, the evaluation as to (4) the image density was conducted by means of a Macbeth reflection densitometer RD-1255. As a result, the recording medium was judged to be accepted like that of Example 1.

EXAMPLE 9

In this example, a porous layer including polymer particles different in pore diameter distribution from one another was formed with the average particle diameter of emulsion resin particles forming the upper layer varied from 0.05 μm to 10.0 μm. Recording media were obtained by forming a porous alumina layer as a lower layer and an upper layer using an emulsion of a polyester resin having its corresponding particle diameter shown in Table 3 in the same manner as in Example 1 except for the above-described conditions. Printing by the ink-jet printer and the heat fixing were then conducted in the same manner as in Example 1 to obtain prints. The recording media and prints were evaluated as to the items (1) to (7) in the same manner as in Example 1. The evaluation results are shown in Table 3.

EXAMPLE 10

In this example, a porous layer including polymer particles as an upper layer was formed with a coating formulation composed of a mixture of two resins A and B in emulsions different in the average particle diameter of emulsion resin particles forming the upper layer from each other. A recording medium was obtained by forming a porous alumina layer as a lower layer and a porous layer including polymer particles as an upper layer in the same manner as in Example 1 except for the above-described conditions. In this case, the average particle diameters of a polyester resin A in emulsion and a polyester resin B in emulsion were 2.5 μm and 0.2 μm, respectively. These resin emulsions were mixed at a ratio of 5:1. The glass transition temperatures of the polyester resins in emulsions were both 57° C., and the minimum film-forming temperature after the mixing was 100° C. The pore diameter of the resultant porous layer including polymer particles was within a range of from 26 to 121 nm, and the degree of overlapping between the pore diameter distribution of the porous layer including polymer particles and the particle diameter distribution of the pigment component was 6.1%.

Printing by the ink-jet printer and the heat fixing were then conducted in the same manner as in Example 1 to obtain a print. The recording medium and print were evaluated as to the items (1) to (7) in the same manner as in Example 1. As a result, the recording medium was judged to be accepted like that of Example 1.

EXAMPLE 11

An experiment was conducted in the same manner as in Example 1 except that in the heat fixing, a pressing treatment was conducted in addition to the heat treatment. In this example, a heated-roll laminator was used in the heat fixing. In this case, the surfaces of both rolls were smoothed, whereby the smoothness of the printed surface of the resulting print was enhanced. Alternatively, the surfaces of both rolls were matte-finished with a pitch of 0.5 μm and a depth of 0.5 μm, whereby a print having a low-reflective printed surface was obtained. The recording medium and print were evaluated as to the items (1) to (7) in the same manner as in Example 1. As a result, the recording medium was judged to be accepted like that of Example 1.

TABLE 1

| Evaluation item | Ex. 1 | Comp. Ex. 1 | Comp. Ex. 2 | Comp. Ex. 3 | Comp. Ex. 4 |
|---|---|---|---|---|---|
| (1) Ink-absorbing speed | A | B | A | B | C |
| (2) Absorbing ability | AA | B | A | A | B |
| (3) Ink-fixing ability | A | C | A | C | B |
| (4) Optical density of image after treatment | 2.55 | 2.40 | 0.80 | 1.99 | 1.93 |
| (5) Resolution of recorded image | A | B | C | B | B |
| (6) Storage stability (temp., humidity) | A | B | A | B | B |
| (7) Storage stability (light fastness) | A | B | A | B | B |
| Judgment on evaluation | Accepted | Rejected | Rejected | Rejected | Rejected |

TABLE 2

| Evaluation item | Ex. 2 | Ex. 3 | Ex. 4 | Ex. 5 | Ex. 6 |
|---|---|---|---|---|---|
| (1) Ink-absorbing speed | A | A | A | A | A |
| (2) Absorbing ability | AA | AA | AA | A | AA |
| (3) Ink-fixing ability | A | A | A | A | B |
| (4) Optical density of image after treatment | 2.49 | 2.46 | 2.52 | 2.54 | 2.60 |
| (5) Resolution of recorded image | A | A | A | A | A |
| (6) Storage stability (temp., humidity) | A | A | A | A | A |
| (7) Storage stability (light fastness) | A | A | A | A | A |
| Judgment on evaluation | Accepted | Accepted | Accepted | Accepted | Accepted |

TABLE 3

| Evaluation item/Particle diameter (μm) | 0.05 | 0.1 | 0.2 | 0.4 | 1.0 | 3.0 | 5.0 | 7.0 | 10.0 |
|---|---|---|---|---|---|---|---|---|---|
| Overlapping between pore diameter and particle diameter | 0.05 | 0.1 | 1 | 2 | 4.3 | 5 | 10 | 30 | 57 |
| (1) Ink-absorbing speed | C | B | B | A | A | A | A | A | A |
| (2) Absorbing ability | C | B | B | A | AA | AA | AA | AA | AA |
| (3) Ink-fixing ability | C | B | A | A | A | A | A | A | A |
| (4) Optical density of image after treatment | 2.40 | 2.44 | 2.45 | 2.50 | 2.55 | 2.35 | 2.00 | 1.20 | 0.93 |
| (5) Resolution of recorded image | C | B | B | A | A | A | B | C | C |
| (6) Storage stability (temp., humidity) | B | A | A | A | A | A | A | A | A |
| (7) Storage stability (light fastness) | B | A | A | A | A | A | A | A | A |
| Judgment on evaluation | Rejected | Accepted | Accepted | Accepted | Accepted | Accepted | Accepted | Rejected | Rejected |

According to the ink-jet recording method of the present invention, as described above, at least a porous layer including polymer particles is formed on a substrate, or the porous layer including polymer particles is formed after a porous layer including inorganic pigment is formed as needed, so as to control the degree of overlapping between the pore diameter distribution of the porous layer including polymer particles and the particle diameter distribution of a pigment component in a pigment ink, whereby the pigment component is arranged in the vicinity of the surface of the porous layer including polymer particles when printing is conducted with the pigment ink, and so a print having a high optical density of image and excellent resolution can be provided. In addition, the porous layer including polymer particles is heated to make it dense and transparent, whereby the pigment ink is reliably fixed, and so the rub-off resistance and water fastness of an image formed can be enhanced. Further, when printing is conducted with an ink containing both pigment component and dye component, both components can be uniformly arranged and fixed. Therefore, the present invention provides a print having good color tone and storage stability.

What is claimed is:

1. An ink-jet recording method in which recording is conducted with an ink comprising a pigment component on a recording medium comprising a substrate and a porous layer formed from thermoplastic resin particles provided thereon, said method comprising the steps of:

forming an image by ejecting the ink onto the recording medium with a proportion of a) the frequency of the pore diameter of pores of the porous layer that overlaps the particle diameter distribution of the pigment component to b) the frequency of the pore diameter of all pores of the porous layer being from 0.1% to 10%, wherein the pore diameter distribution of the porous layer and the particle diameter distribution of the pigment component are both expressed in terms of frequency distribution; and heat-treating the porous layer after the formation of the image, wherein the pore diameter of all pores of the porous layer is within a range from 10 to 300 nm.

2. The ink-jet recording method according to claim 1, wherein, after the image is formed, the pigment component is arranged within a range from a surface of the porous layer onto which the ink is ejected to a depth of 5 μm.

3. The ink-jet recording method according to claim 1, wherein the pore diameter distribution of the porous layer within a range from a surface of the porous layer onto which the ink is ejected to a depth of 5 μm is 100 nm or smaller.

4. The ink-jet recording method according to claim 1, wherein the thickness of the porous layer falls within a range of from 1 to 40 μm.

5. The ink-jet recording method according to claim 1, wherein the content of the pigment component in the pigment ink falls within a range of from 0.1 to 20% by weight based on the total weight of the ink.

6. The ink-jet recording method according to claim 1, wherein a porous layer including inorganic pigment is formed between the substrate and the porous layer formed of thermoplastic resin particles.

7. The ink-jet recording method according to claim 6, wherein an ink-absorbing capacity of the porous layer including inorganic pigment is greater than that of the porous layer formed of thermoplastic resin particles.

8. The ink-jet recording method according to claim 6, wherein an ink-absorbing speed of the porous layer formed of thermoplastic resin particles is higher than that of the porous layer including inorganic pigment.

9. The ink-jet recording method according to claim 1, wherein the ink further comprises a dye component.

10. The ink-jet recording method according to claim 9, wherein the dye component passes through the pores of the porous layer formed of thermoplastic resin particles and is fixed into the porous layer including inorganic pigment.

* * * * *